United States Patent [19]

Schiffers, Jr.

[11] 4,185,435

[45] Jan. 29, 1980

[54] ANCHOR CLAMP FOR SERRATED GRATING

[76] Inventor: Albert Schiffers, Jr., 2324 Central, Evanston, Ill. 60201

[21] Appl. No.: 874,791

[22] Filed: Feb. 3, 1978

[51] Int. Cl.² .............................................. E04B 1/38
[52] U.S. Cl. .................................... 52/507; 248/500
[58] Field of Search ............... 52/180, 507, 714, 489, 52/465, 466; 248/500, 507, 510; 85/24

[56] References Cited

U.S. PATENT DOCUMENTS

| | | | |
|---|---|---|---|
| 1,196,964 | 9/1916 | Meltz | 52/507 |
| 2,467,877 | 4/1949 | Barry | 52/507 |
| 2,572,432 | 10/1951 | Bates | 52/507 |
| 3,106,271 | 10/1963 | McGee | 52/489 |
| 3,466,829 | 9/1969 | Robicheaux | 52/507 X |
| 3,742,671 | 7/1973 | Ellis | 52/507 |

FOREIGN PATENT DOCUMENTS 630624  4/1963  Belgium .................................. 52/507

Primary Examiner—C. J. Husar
Assistant Examiner—Conrad Berman

[57] ABSTRACT

An anchor clamp for securing serrated gratings, said clamp having a multitude of apertures for cooperation with the serrations; thus, retarding both vertical and lateral movement of the grating.

3 Claims, 4 Drawing Figures

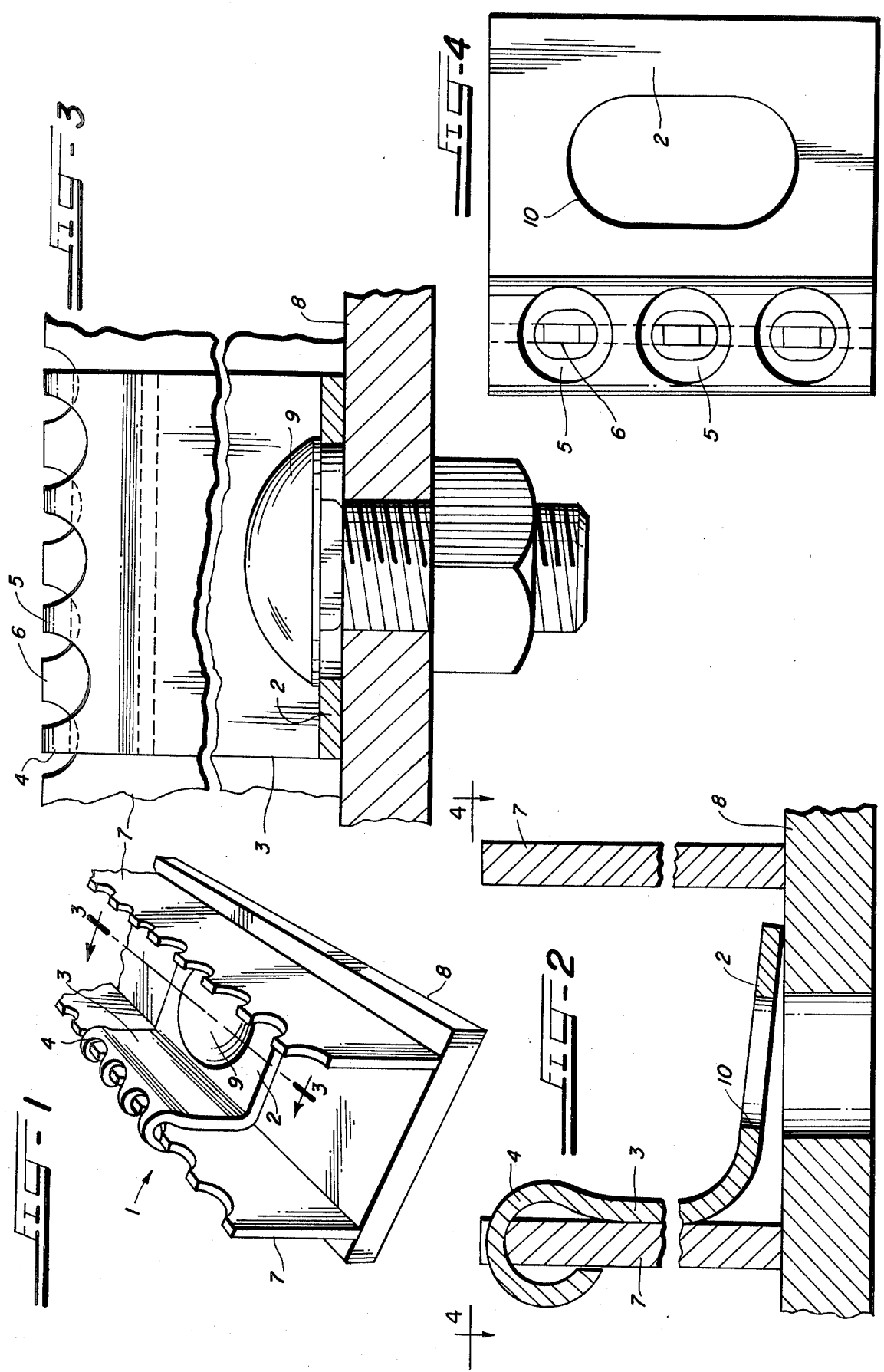

ANCHOR CLAMP FOR SERRATED GRATING

BACKGROUND OF THE INVENTION

This invention relates to means for securing serrated metal gratings, such as walkways and scaffolds, to support surfaces. More specifically, the invention relates to clamping means for securing such gratings in applications where the gratings are subject to vibrations such as where the gratings are mounted on railroad cars.

Currently, such gratings are secured in applications subject to vibrations such as railroad cars by welding. However, while welding such gratings to support surfaces securely fixes them in place, such an operation is costly and results in significant downtime for performing repairs which generally cannot be made in the field.

Conventional clamping means, while suitable for use in static applications, such as securing gratings over subway ventilators, are not suitable for use in dynamic applications such as railroad cars.

Accordingly, it is the primary object of the present invention to supply a mechanical clamping means suitable for firmly securing serrated gratings in applications where the gratings are subject to vibrations.

It is a related object of the present invention to provide a clamping means for serrated gratings which permits easy field repairs of damaged sections of such gratings.

Other objects and advantages of the present invention will become apparent upon reading the attached detailed description and upon reference to the drawings in which:

FIG. 1 is a perspective view of the clamp of the present invention;

FIG. 2 is a side elevational view of clamp of the present invention in cooperation with a serrated metal grating;

FIG. 3 is a view taken along the line 3—3 of FIG. 1;

FIG. 4 is a view taken along line 4—4 of FIG. 2.

Referring to FIG. 1, clamp 1 is provided having a base surface 2 and a generally upright surface 3 projecting from one end of said base surface and terminating in an outwardly projecting open loop portion 4.

Referring to FIGS. 2, 3 and 4, the operation of the present invention in cooperation with a serrated grating will be explained. The loop portion 4 is provided with a multiplicity of apertures 5 at its topside which appear as notches in FIG. 3. These apertures 5 are spaced a distance equal to the distance between the peaks 6 of the serrations of serrated grating 7.

Accordingly, when the clamp 1 is in place over the serrated grating 7 the apertures 5 are aligned with peaks 6 permitting peaks 6 to project through the apertures as shown in FIG. 3.

In order to permit receipt of the serrated grating 7 into the loop portion 4 the loop portion is open at the bottom a distance at least as wide as the width of grating 7.

The grating is then held firmly in place by securing base portion 2 to support surface 8 by any convenient means, such as by a bolt 9 passing through an opening 10 in the base plate.

If a bolt is used to secure the base plate to the support surface, it is preferable to provide a slotted opening 10 in the base plate in order to permit lateral movement of the clamp and thus enable alignment of apertures 5 and peaks 6 prior to securing.

It is also preferable that upright surface 3 be of the length slightly less than the height of serrated grating 7 and forming an obtuse angle with base portion 2 as shown in FIG. 2. In this configuration the bottom of base plate 2 nearest serrated grating 7 is slightly above support surface 8. Thus, when the base plate 2 is fastened by means such as a bolt 9, loop section 4 is drawn firmly down on the top of serrated grating 7 thus inserting secure clamping.

It is preferable that loop section 4 be of a generally circular shape cross section as shown in FIG. 2 since this will minimize any tendency for the outward portion of loop 4 to bend away from grating 7.

From the foregoing it will be seen that serrated gratings can be firmly secured in place by means of the clamp of the present invention in such a manner so as to prevent not only upward movement of serrated gratings but also so as to prohibit lateral motion of such gratings. Accordingly, damaged sections of gratings can be readily repaired in the field without the need of special equipment such as welding equipment.

While the foregoing invention has been described with reference to a preferred embodiment it will be understood that I do not intend to be limited to the particular embodiment shown but intend on the contrary to cover the various alternative and equivalent forms of the present invention included within the scope of the apended claims.

I claim:

1. A clamp in combination with a serrated grating for securing said serrated grating to a support surface which is subject to vibrations comprising a serrated grating having a multiplicity of serrations and a clamp having a base, a generally upright surface projecting from one end of the base and terminating in an outwardly projecting open loop having a multiplicity of apertures at the topside for cooperation with the serrations of said grating, said apertures spaced a distance apart equal to the spacing of the serrations on the grating, means for securing the base portion to a support surface.

2. The combination of claim 1 wherein the upright surface of the clamp is of a length slightly less than the height of the serrated grating and wherein said upright surface forms an obtuse angle with the base surface.

3. The combination of claim 1 wherein said base is provided with a slotted opening and wherein said means for securing the base portion to a support surface comprises a bolt passing through said slotted opening and through said support surface whereby said clamp can be positioned so as to insure that the serrations align with the multiplicity of apertures.

* * * * *